E. THOMAS.
COMBINED TYPE WRITING AND COMPUTING MACHINE.
APPLICATION FILED MAR. 15, 1915.
1,294,727.
Patented Feb. 18, 1919.
6 SHEETS—SHEET 1.
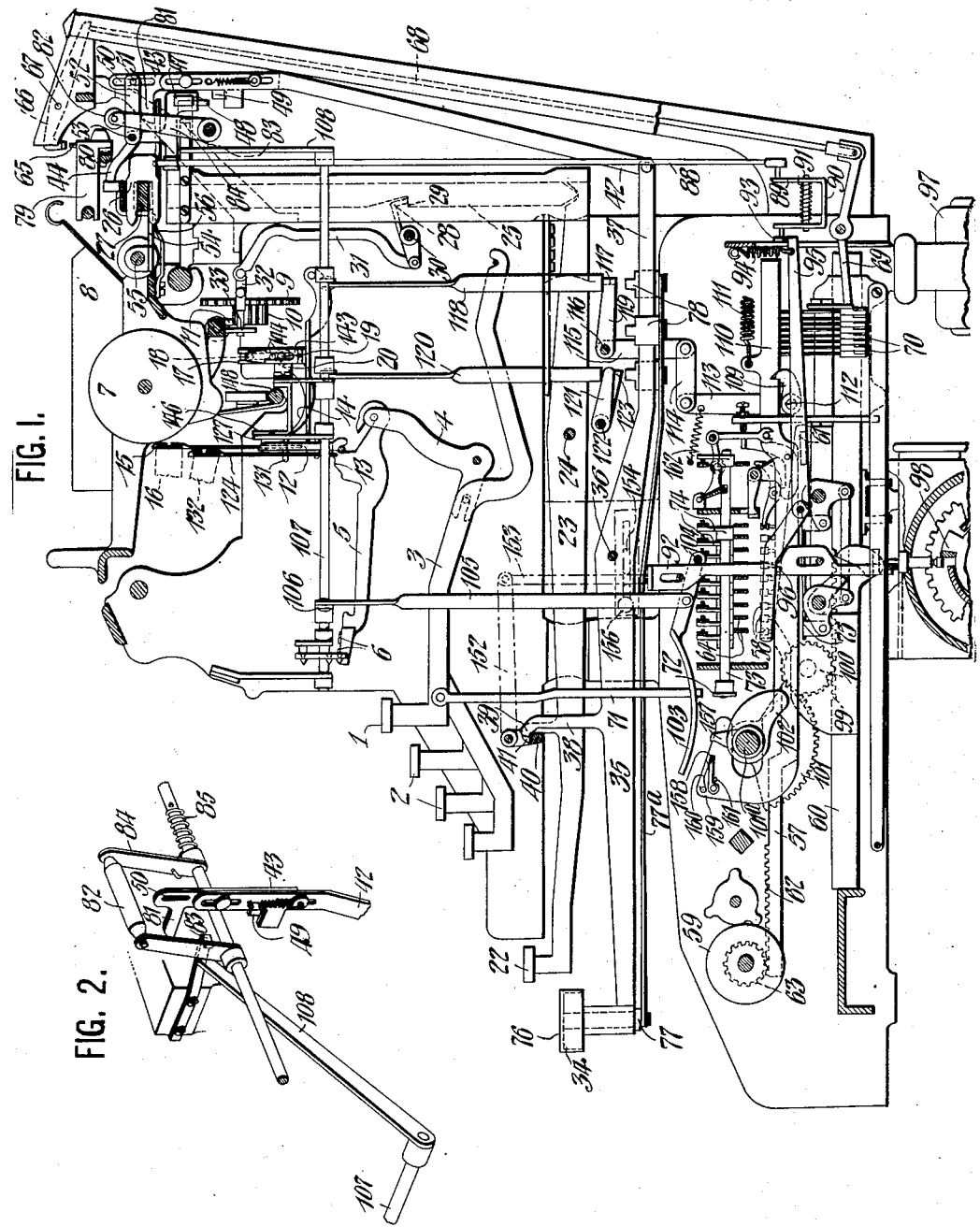
WITNESSES:
INVENTOR:
Edward Thomas
BY
ATTORNEY.

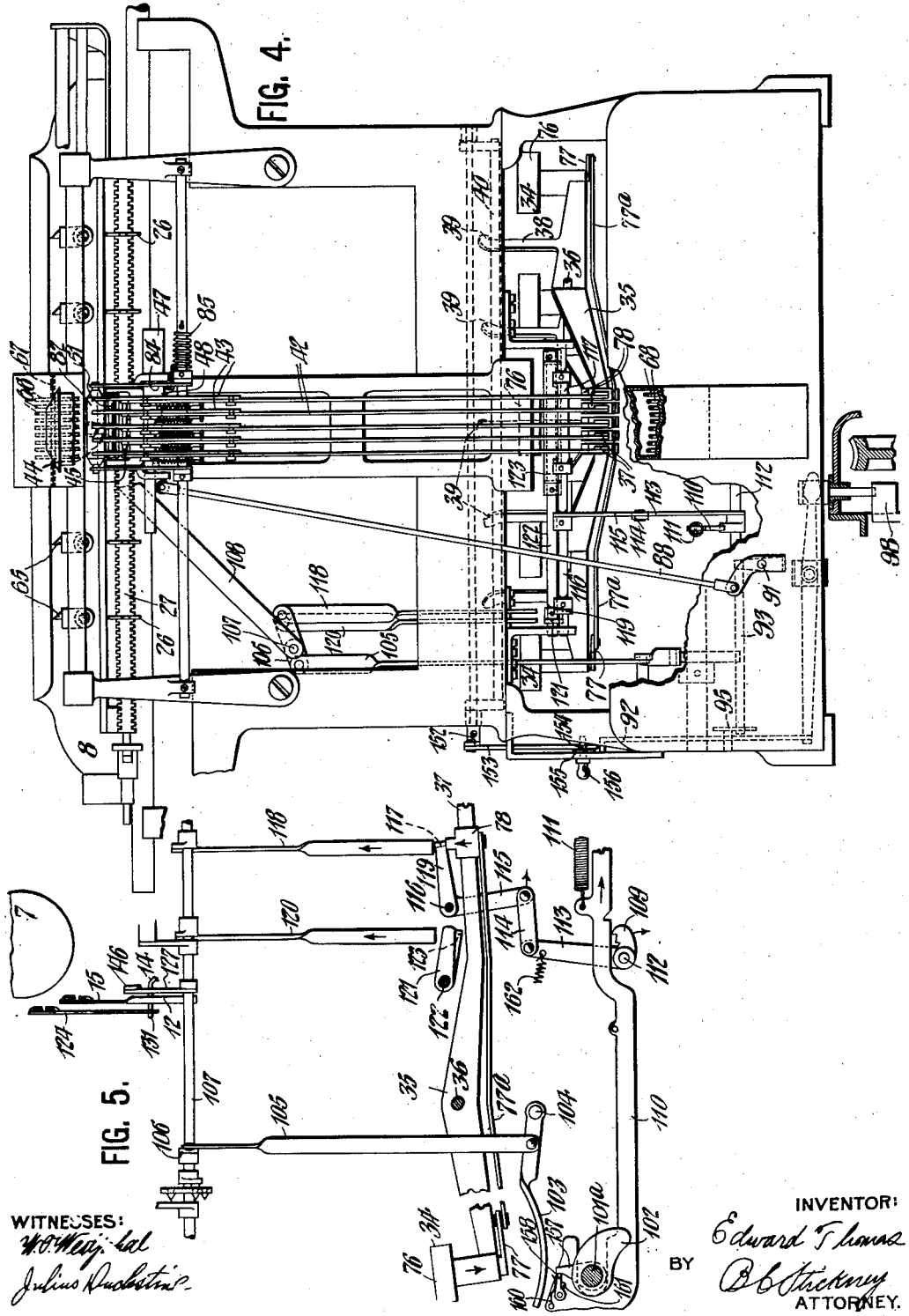

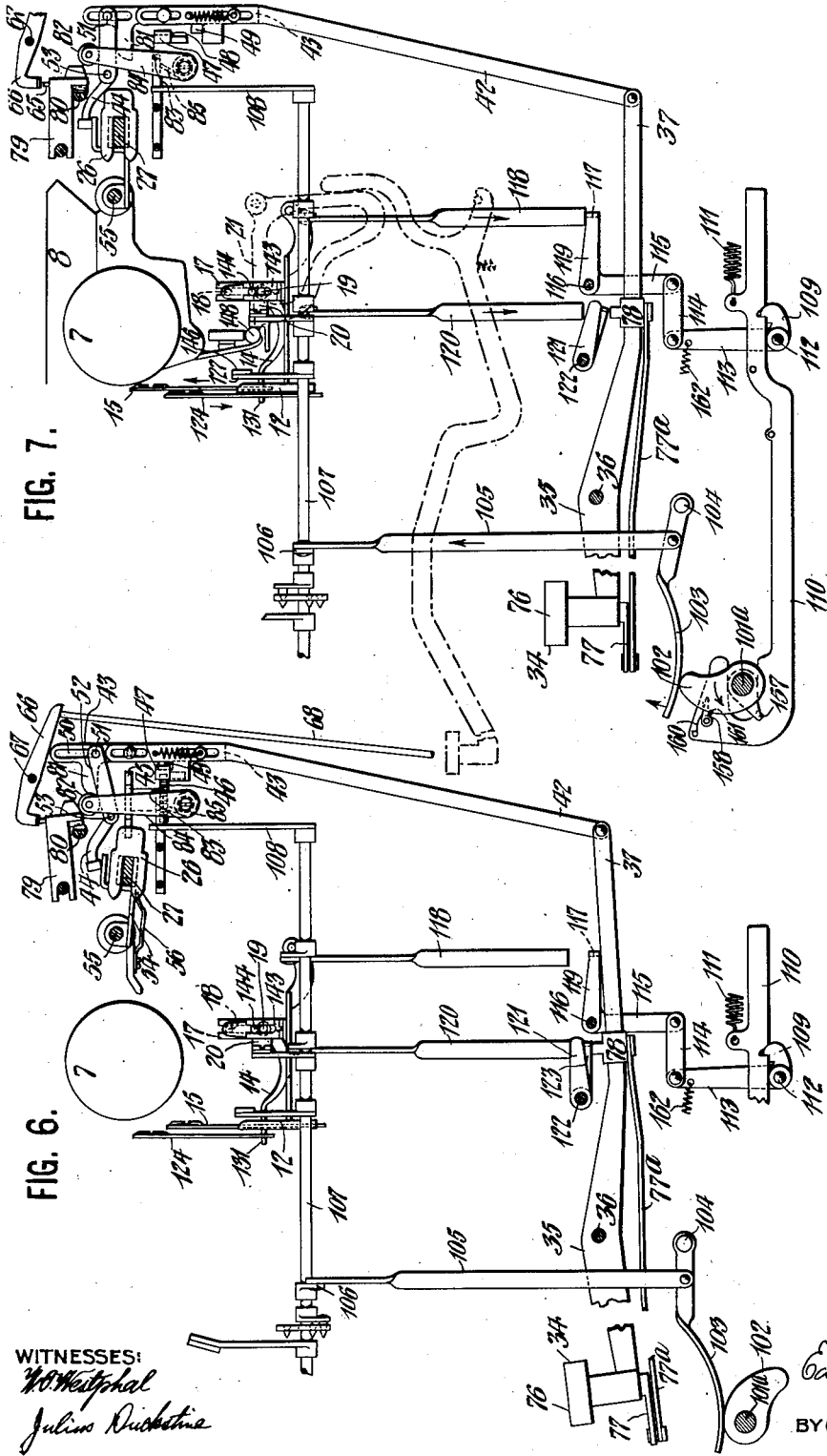

E. THOMAS.
COMBINED TYPE WRITING AND COMPUTING MACHINE.
APPLICATION FILED MAR. 15, 1915.

1,294,727.

Patented Feb. 18, 1919.
6 SHEETS—SHEET 5.

WITNESSES:
W. O. Westphal
Julius Duchs

INVENTOR:
Edward Thomas
BY
D. C. Stickney
ATTORNEY.

E. THOMAS.
COMBINED TYPE WRITING AND COMPUTING MACHINE.
APPLICATION FILED MAR. 15, 1915.
1,294,727.
Patented Feb. 18, 1919.
6 SHEETS—SHEET 6.
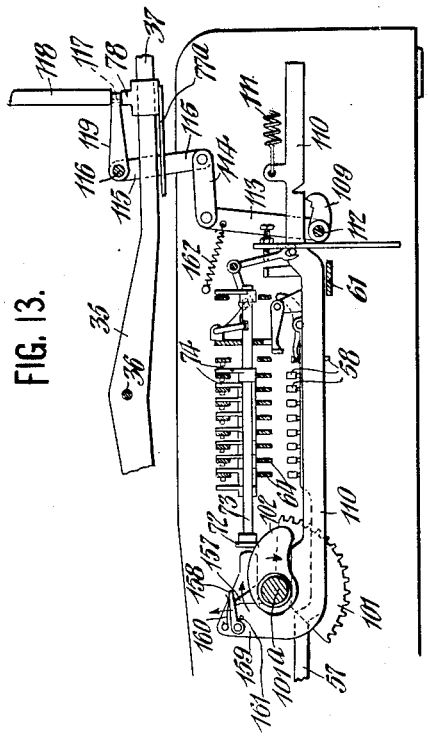
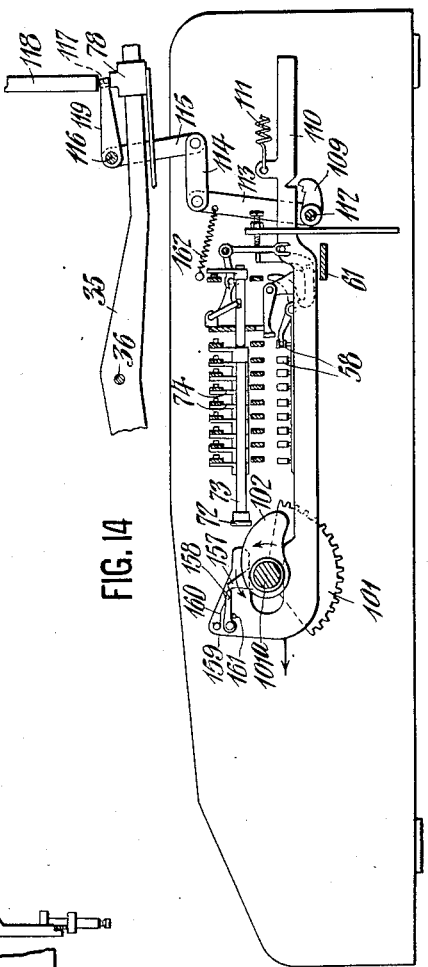
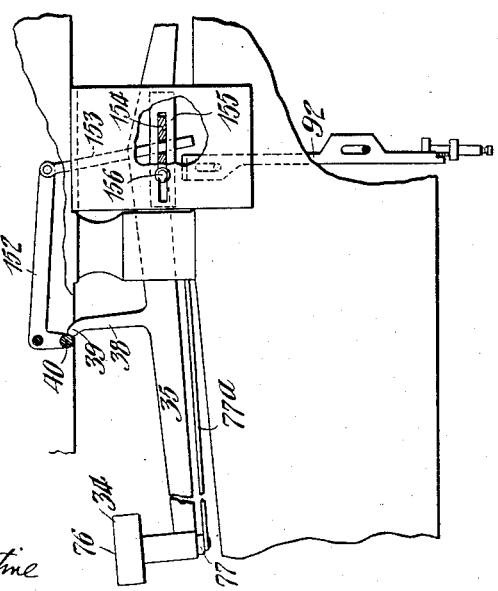
WITNESSES:
INVENTOR:
Edward Thomas
BY
ATTORNEY.

UNITED STATES PATENT OFFICE.

EDWARD THOMAS, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,294,727.      Specification of Letters Patent.      Patented Feb. 18, 1919.

Application filed March 15, 1915. Serial No. 14,337.

*To all whom it may concern:*

Be it known that I, EDWARD THOMAS, a citizen of the United States, residing in New York city, in the county of New York and State of New York, have invented certain new and useful Improvements in Combined Type-Writing and Computing Machines, of which the following is a specification.

This invention relates to computing machines, and is herein disclosed as applied to an Underwood-Hanson combined typewriting and computing machine, wherein the numeral keys of the typewriter when writing in a computing column, set up pins on computation bars, these pins representing the digits written. After a number has been so set up, it is carried into computing wheels by means of a general operator. The machine herein disclosed is also adapted to either add, subtract, or be neutral in a computing zone.

One of the objects of the present invention is to provide means for enabling the rapid location and tracing out of errors. In said Underwood-Hanson machine, I find it most convenient to provide such means by equipping the machine with means for writing in three different colors, one of which may be black, another red, and another green. In order to make errors conspicuous, I find it convenient to provide means whereby when the machine is adding, one color will be used, say green; when it is subtracting, another color may be used, say red; and when it is writing matter neither to be added nor subtracted, the usual black ribbon may be used.

I also find it convenient to provide means whereby the machine may be power driven, and means whereby the operative, in the usual operation of the machine, may have the burden of remembering when to start the power mechanism taken off his attention. For this purpose, I find it convenient to provide the mechanism with column-selecting keys, so that, when passing from one adding zone to the other, the column-selecting keys may be utilized for several different purposes, one of which may be for causing the adding-in of numbers by the power mechanism.

Where such column-selecting keys are used, I have found it advantageous to also use decimal tabulating keys operable only after the column-selecting keys are operated. By utilizing the column-selecting keys for starting the power drive of the adding mechanism, I insure that every time any numbers are set up in the adding mechanism, the adding mechanism will carry into the computing wheels any numbers that have been previously set up before any new numbers are written. Since in the Hanson machine this requires delay, and my invention is herein shown as applied only to such a machine, some delaying means are required for preventing the mechanism from setting up numbers after starting the power drive. This delaying I have provided in the decimal tabulating key connections, which insure that a column-selecting key must be depressed before any decimal tabulating key, and the delay incidental to the depression of a tabulating key allows the adding operation to be completed before the operative will be ready to write any numbers to be computed.

I have also found it convenient to shift the printing color by the column-selecting keys. These keys may be provided with means individual to the keys themselves for controlling the color and the adding and subtracting, with the result that the operative is enabled to set up on the machine easily and rapidly the desired order of operations without having to peer over behind any other mechanism to see what the machine is set for doing.

Other features and advantages will hereinafter appear.

In the accompanying drawings,

Figure 1 is a sectional side view of an Underwood-Hanson combined typewriting and computing machine showing so much thereof as is convenient for the illustration of my invention.

Fig. 2 is a fragmentary perspective view, showing the connections for making the computing mechanism effective.

Fig. 4 is a rear view of Fig. 1.

Fig. 5 is a diagrammatic side view showing how a selecting key may cause subtraction.

Fig. 6 is a similar view showing a selecting key setting the parts to add.

Fig. 7 shows a selecting key which would set the parts to addition if it were depressed, the parts, however, standing in normal position, and ready to write black without computing unless said selecting key is depressed.

Fig. 12 is a detail view showing how a column-selecting key starts the power drive.

Fig. 13 is a detail showing the device for rendering the subtraction bar ineffective on the back stroke of the general operator.

Fig. 14 is a detail, showing said returning device in operation.

Figure 3:
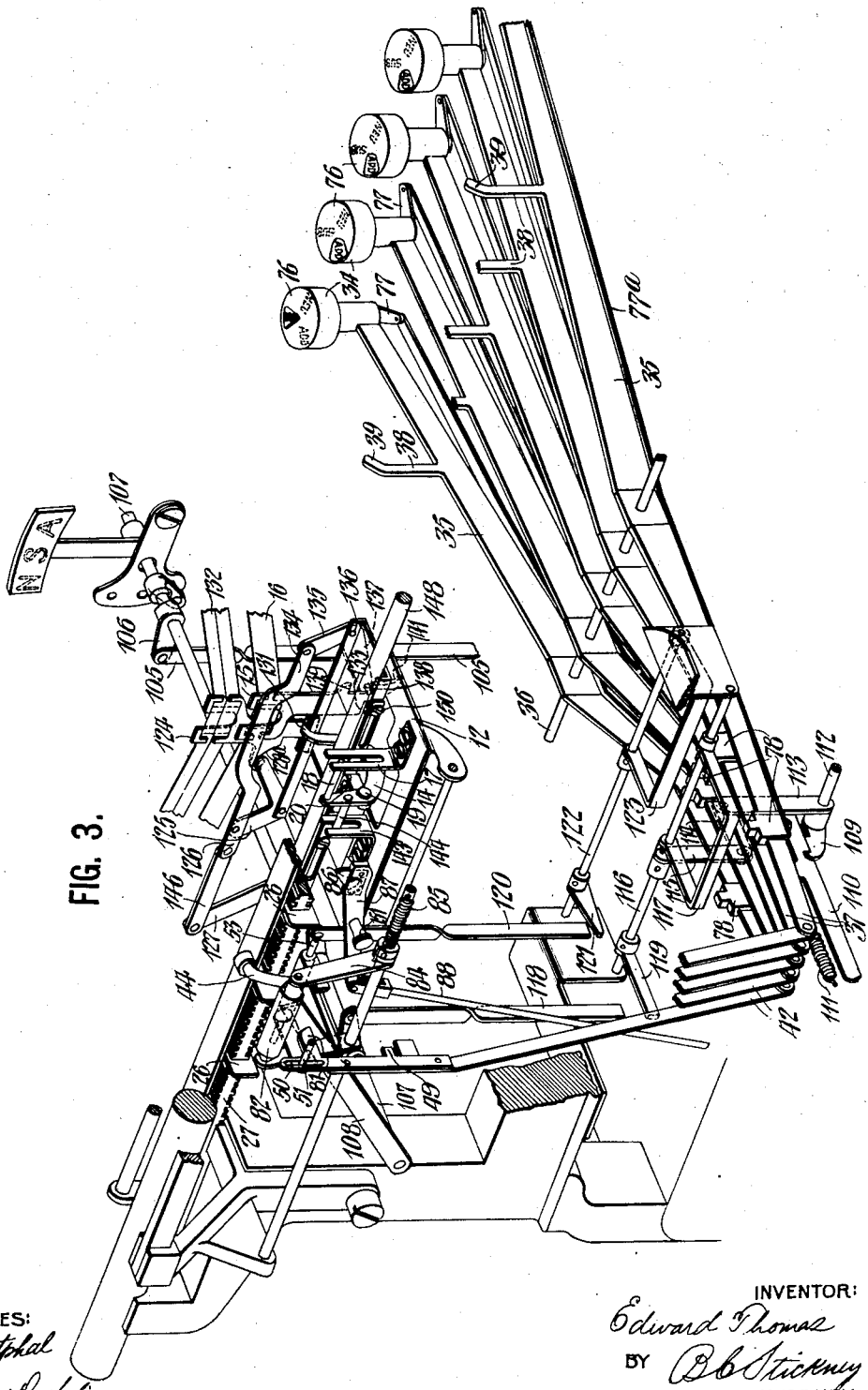
Fig. 3 is a skeleton perspective designed to show principally, the connections between the column-selecting keys, denomination-selecting mechanism, and the ribbon color-determining mechanism.

In the usual Underwood-Hanson combined typewriting and computing machine, numeral keys 1 and alphabet keys 2 depress key levers 3, thus rocking sub-levers 4 to cause type-bars 5 to swing upwardly and rearwardly so that types 6 thereon will print on the front face of a platen 7, said platen forming part of the usual traveling carriage 8. Said carriage, as usual, is constantly under the tension of a spring barrel, not shown herein, which tends to draw said carriage in letter-feeding direction. Said carriage is controlled in its letter-feeding by means of the usual escapement wheel 9 connected to a pinion 10, said pinion meshing with a rack 11 connected as usual to the typewriter carriage. The escapement wheel 9 is adapted to be fed forward a step at a time, by means of the usual escapement dogs, which are omitted in the drawings for the sake of clearness, and said dogs are operated by means of a universal bar 12, which is swung rearwardly every time a type-bar approaches the platen, this being done by a heel 13, on each type-bar, which strikes a forward extension of said universal bar. In order that printing may be done, the machine is provided with the usual ribbon vibrator 14, the front end of which engages a ribbon carrier 15, which normally lies in front of the platen and below the printing point thereof. The usual black ribbon 16 is threaded through this ribbon carrier in the usual manner, and the connections are such that the ribbon is thrown up to the printing point by means of the usual vibrator 14.

The means for accomplishing this ribbon-throw include an actuator 17, in the form of a slotted plate mounted on the universal bar 12, and the vibrator 14 is extended upward at its rear end where it has a pin 18 extending to one side and adapted to engage the slot in the actuator 17. The vibrator is pivoted at 19 between the ribbon carrier 15 and the pin 18 on a plate 20, connected to the typewriter shift frame 21. The structure of said shift frame is not shown in detail herein, since it is of the usual Underwood type and is well-known and shown in many patents.

The Underwood typewriting machine is also frequently provided with a decimal tabulating mechanism including keys 22 mounted on the front ends of key levers 23 which are pivoted on a rod 24, so that the rear ends of said key levers will raise the usual decimal plungers or counter stops 25 into the path of any column-stop 26 which is set on the column stop bar 27.

In the present machine, the decimal tabulating mechanism is modified somewhat from that usually found in the Underwood machine, and is much like that shown in the patent to Lester A. Wernery, 1,108,415 of August 25, 1914, and shown in further detail in my prior application No. 782,391, filed August 1, 1913. The mechansm, however, includes the usual short universal bar 28, which overlies heels 29 on the plungers 25, and is pivoted at 30, so that the front end thereof will draw down a link 31 pivoted thereto, thereby swinging a lever 32 pivoted to the upper end of said link, to cause an idle wheel 33 on the front end of said lever 32 to lift the rack bar 11 from the escapement pinion 10, thus permitting the carriage to be drawn along by the spring barrel, above described, until the carriage is arrested by a column-stop 26 which strikes the elevated one of the decimal counter-stops 25.

In the present mechanism, and in that shown in my prior application, above described, the decimal tabulator keys 22 are normally locked, and the column-stop bar 27 normally holds the column-stops 26 out of reach of the decimal plungers or stops 25 even if elevated, this being the general kind of device disclosed in the Wernery patent and in my said application, above referred to.

In order to release the decimal keys 22 to enable them to be depressed, a column-stop key 34 must first be depressed. There are a number of said column-stop keys, but for clearness, only five are illustrated in the present machine. These keys are mounted on the front ends of key levers 35, which are pivoted at 36 intermediate their ends, and have column-selecting rearward extensions 37 which will presently be described.

Whenever any one of these column-selecting keys is depressed, it releases all the decimal tabulating keys 22 by means of an arm 38 which extends upwardly from the lever 35, and is formed with a cam extension 39, which as the key lever is depressed, rides down on a rocking bail 40, which normally underlies rocking arms 41 extending upwardly from the decimal tabulating key levers 23. Said bail, as described in my application 782,391, above referred to, normally holds the decimal tabulating keys locked, but when swung forward by the depression of a column-key, becomes ineffective, thus permitting any decimal tabulating key to elevate its counter-stop 25, and release the typewriter carriage. Before any decimal key, however, is thus depressed, the depression of the column-selecting key 34 has selected a column at which the column-stop 26 will be brought down adjacent the counter-stops 25, so that it will be intercepted by any elevated counter-stop, and thereby arrest the carriage.

To bring this about, each column key 34 when depressed, raises its rear end 37, so that a column-selecting rod 42 pivoted to the rear end thereof, will endeavor to raise a column-selecting slide 43, of which there is one for each of the rods 42, and if it can move this slide 43, said slide will rock the front end of a depressor lever 44 downwardly, with the result that said depressor lever will depress the column-stop bar 27 with its stops 26, to a point where said stops will be intercepted by any elevated counter-stop 25. The column-stops 26 as described in the Wernery patent above referred to, operate a column-selecting wheel 45, turning said wheel one step every time a column-stop passes the wheel, and this wheel by means of a pinion 46, fast to the lower end of the shaft of said wheel, turns a column-selecting slide 47, which slide includes a ledge 48, normally overlying all but one of certain lugs 49 on the column selecting slides 43. Whenever the typewriter carriage in its travel, carries the first column-stop 26 past the column-selecting wheel 45, said stop turns said wheel so that the slide 47 and ledge 48 move one step to the left, and carries said ledge free of one lug 49, thus permitting said lug to rise upwardly, if under tension. If at this time the second column-selecting key 34 is depressed, its lug 49 can rise, and thus be effective on the depressor bar 44. This releasing of a lug 49 occurs successively every time another column-stop passes the column wheel 45. Thus the column-selecting slide 47 determines what column-selecting key will be effective to bring a column-stop 26 to effective position, and therefore determines at what column the typewriter carriage shall be arrested.

As disclosed in my prior application 782,391, the slide 47 may also include parts for preventing the depression of a column-selecting key after the column has been passed on which the key should have been effective.

In order that each slide 43 may operate without interference with any other slide, said slides 43 are provided with slots 50, through which passes a bail 51 by which bail said slides operate the depressor bar 44, said bail 51 being attached to arms 52 extending rearwardly from the pivots 53 on which the depressor bar 44 is located. In order to permit said depressor bar to swing the column-stop bar 27 in the manner described, said column-stop bar is carried on arms 54 pivoted at 55 on the carriage, and is normally held up in ineffective position by a spring 56.

In order to provide for the registering of numbers that are being printed by the typewriter numeral keys 1, the Underwood-Hanson machine is provided with denomination members 57, on each of which are digit pins 58, there being a denomination member 57 for each letter-space in the computing column, and there being a full set of digit pins 58 on each of the denomination or computation members 57. As the numeral keys 1 of the typewriter are depressed to write numbers in the adding column, said keys set up the pins 58 in the usual manner, by depressing them,—one pin on each of the computation members 57. When the final or units pin in any column is set up, the numbers thus set up are carried into the usual computing or adding wheels 59 at the front of the machine, by means of a general operator, which includes side bars 60 and a cross-bar 61, said cross-bar being adapted, as the general operator comes forward, to catch the projecting end of the depressed pin 58 on each computation member 57, and drive said member forward in the usual manner, to turn its computing wheel 59. It will be obvious that the amount to which said wheels are turned depends on the positions of the pins depressed.

When a number has been thus carried into the computing wheels, the general operator moves rearwardly and returns the computation members 57 to their normal position. The computing wheels fail to turn on this backward motion although the racks 62 on the forward ends of the computation members 57 still mesh with the pinions 63 of the computing wheels, because of pawl-and-ratchet connections between said pinion and the computing wheels, not shown herein.

In the present instance, the general operator is shown as being connected automatically to be driven by means of a motor and mechanism which is only diagrammatically shown, and which will be described so far as necessary later on. For clearness of illustration, the usual hand-operating device which may equally be used, is omitted.

In order to set up the pins 58 on the computation members 57, there is provided the usual series of pin-setting bars 64, each of which when any computation member 57 is in proper position, is adapted to be swung downwardly by its numeral key, as will be described, and will then depress the pin 58 corresponding to it on the computation member 57. The means for doing this are shown in the patent to H. Hanson, 816,319, dated March 27, 1906. In said patent, the computation members 57 are normally in the position seen in Fig. 1, but in the adding zone, the computation members are lifted one after another, by the travel of the typewriter carriage, to position where the pins on them are brought within range of the pin-setting bars 64. In the machine as herein disclosed, and as shown in the application of Frederick A. Hart, No. 650,700, filed September 22, 1911, (now Patent No. 1,237,900, dated August 21, 1917), the computation members are raised to said effective position by means of a tappet 65 settable along the typewriter carriage, which tappet, as the carriage travels along, passes under and lifts, one after another, the front ends of a series of jacks 66, which are pivoted at 67 in the usual casing. The rear ends of said jacks are thereby caused to depress rods 68, which latter, in turn lift the front ends of levers 69, each lever 69 acting to lift its computation bar 57 by means of the usual transposition device 70.

The connections whereby the numeral keys operate the pin-setting bars 64, are substantially those shown in said Hanson patent, and include pendants 71, there being one pendant on each numeral key, each of which is adapted to operate its rock arm 72, on its rock shaft 73, which shaft has fast thereto a second rock arm 74 which engages the addition bars forming parts of linkages which include the pin-setting bars 64, and other parts including bell cranks, as disclosed in said Hanson patent.

When a number has been set up by the numeral keys in this manner, at the point determined by the typewriter carriage and carried into the computing wheels, and the general operator has been returned, the pins 58 are all restored to their normal position by means of the usual pin-setting platform 75 in the manner set forth in said Hanson patent.

The mechanism is effective in the manner described, only when one of the column-selecting keys 34 has been set so it will cause addition, and then depressed, so as to select the adding column. These column-selecting keys are provided with means for determining whether the mechanism shall add, subtract or be neutral, said mechanism being of the general scope shown in my prior application 782,391. For this purpose, the column-selecting keys include caps 76 on the tops of shafts which extend through said keys, and are provided with rock arms 77 at the bottom of the keys, said rock arms operating computation-controlling lugs 78 embracing and slidable along the rear ends 37 of the key levers 35. The rock arms 77 slide the lugs 78 to their proper positions by links 77ª pivoted to said rock arms and to the base of the lugs 78.

When any one of the lugs 78 occupies the front position shown, for example in Figs. 6 and 7, its column-selecting key 34 when depressed, will cause the computing mechanism to be set for addition. For reasons set forth later, and by mechanism to then be described, said lug will also cause the printing ribbon of the typewriter to cause printed matter to appear in green. To accomplish this setting to addition, the column-selecting key slides 43 are provided with means whereby they set the tappet 65 from its normal ineffective position seen in Fig. 7 to its effective position seen in Fig. 6, in which latter position, said tappet is within range of the jacks 66. In its ineffective position, the block 79, on which the tappet 65 is mounted, rests on a rod 80. When the column-selecting slide 43 rises, a forwardly extending cam lug 81 fast on said slide, strikes beneath and forces forward the usual controlling roll 82, which may be connected to the platen shifting mechanism, and other parts of the computing machine, as set forth in the co-pending application of William L. Gumprecht, 725,384, filed October 12, 1912, (now Patent No. 1,237,895, dated August 21, 1917), said roll moving from the position seen in Fig. 7 to the position seen in Fig. 6, in which latter position it is locked by the catch 83, said roll being for this purpose, mounted as a bail in the swinging frame 84, and being normally held in its ineffective position by means of a spring 85. When thus moved forward to raise the tappet 65 to effective position, the roll will stay there until released in a manner hereinafter described.

When said tappet 65 is in its raised or effective position the numeral keys are effective to set up numbers in the manner described above, on the pins 58, this being so, because the computation members 57, which normally hold the pins clear of the pin-setting bars 64, are then raised by said tappet, so as to bring their pins to pin-setting position. Any numbers now written will be set up on the pins 58 for addition, and when the digits forming the number to be computed have been all written by the numeral keys of the typewriter, said digits are carried into the computing wheels 59 in the manner above-described.

To carry the numbers into the computing wheels 59, automatically, the machine is provided with an ordinary form of electric motor drive, of which one form, is illustrated in the co-pending application of Ogden Minton, 797,714, filed October 28, 1913.

For this purpose, the machine is provided with a motor trip dog 86, seen in Fig. 3, which is adapted to be struck by the column-stop 26 when moving in letter-feeding direction, and when so struck, said dog is cammed downward, because said stop strikes it on its cam face. In being cammed downward, said dog swings downwardly the lever 87 on which it is mounted, thus drawing upwardly the starting link 88 pivoted to the opposite end of said lever, said starting link 88 having attached to its lower end, a bell crank 89, in the form of a bail 90, pivoted on a shaft 91. This bell crank in the manner disclosed in the Minton application aforesaid, controls the usual starting bar 92 of the power-driven Underwood-Hanson machine, by means of a latch 93, the details of which are shown in said Minton application. Whenever the dog 86 is depressed, therefore, it draws up the link 88 and swings the latch 93 to effective position, thus allowing a spring 94 to draw up the adjacent end of a starting lever 95, thereby depressing the opposite end of said bar which overlies a pin 96 on the starting bar. Thus the depression of the dog 86 by a column-stop 26, elevates the starting bar, and permits the motor 97 to drive the general operator of the computing mechanism through the usual clutch 98. The movement of the general operator automatically lifts the forward end of the starting lever 95 and puts said lever again under the control of the latch 93 in the manner set forth in said Minton application.

The movement of the general operator to carry the numbers set up into the wheels 59, is also effective to restore the mechanism to non-adding position. For this purpose, the general operator, by means of the rack bar 99 forming part of the side bar 60, rotates the usual idle pinion 100 meshing with the usual segment 101 to swing the cam 102 fast on the segment shaft 101ª, against a restoring arm 103 which is pivoted in the framework of the machine at 104, and is adapted to release the controlling roll 82. This it does by means of an upwardly extending link 105 pivoted to said restoring arm at its lower end and pivoted at its upper end to a rock arm 106 fast to a backwardly extending rock shaft 107. This shaft, whenever the restoring arm 103 is struck by its cam 102, swings a long rock arm 108 fast to the rear end thereof, so that said rock arm 108, as seen in Fig. 2, releases the frame 84 from its catch 83. This allows the tappet 65 to drop again to ineffective position, thus, in effect, disconnecting the adding mechanism from the numeral keys of the typewriter. Besides adding, the mechanism is adapted to subtract, and the column-selecting keys 34 are effective to make the machine subtract when any one of them is depressed, if its lug 78 is in the rearmost position, (see Fig. 5). The lugs 78 are shifted rearwardly through the links 77ª, and the position of the lug is indicated as being that of subtraction whenever the letters "Sub." appear through the cap of the key.

To bring about subtraction, the mechanism used is somewhat similar to that shown in the Minton application 797,714, above referred to, which is of the complemental subtraction type. The present machine is effective to subtract whenever a subtraction catch 109 is released to permit the subtraction-setting bar 110 to be drawn rearwardly by its spring 111. This release of the catch 109 is brought about whenever a column-selecting key 34 is depressed with its lug in the rearmost position by rocking the rock shaft 112 on which said catch is fast, said shaft 112 being provided for this purpose with a rock arm 113, which is connected by a link 114 to a downwardly extending rock arm 115 on a shaft 116, the latter having a bail 117 thereon which overlies all the lugs 78 that lie at the rearward position on the column-selecting key levers 35.

Whenever the subtraction bar 110 is thus released, to cause subtraction, it sets all the "9" pins in the usual manner, and also shifts all the rock shafts 73 forwardly, so that the addition rock arms thereon are carried clear of their pin-setting linkages, while subtraction rock arms also fast on said shaft, engage linkages having complemental values, in the usual manner, as set forth in said Minton application. Other connections are also made effective, the details of which are in nowise material to the present invention. At the same time, of course, the controlling roll 82 is moved to effective position precisely as if the machine were being set for addition. Therefore, if the numeral keys are now depressed, the numbers written will be set up on the pins 58, and be carried into the computing wheels 59 as in addition. When the numbers are carried into the computing wheels, the roll 82 will be released precisely as in the adding operation.

Besides causing the machine to add, subtract or be neutral, the column-selecting keys are also adapted to determine in what color the numerals written at any time shall be printed. For this purpose, in addition to the usual black printing ribbon mechanism described above, there is provided means whereby red or green digits or letters may also be printed.

To accomplish this, in the Underwood machine which is shown herein, the two-ribbon device shown in Patent No. 1,140,274 granted May 18, 1915 to J. C. McLaughlin, is utilized, and one of the ribbons of said device is herein adapted to print in either of two colors, red or green, for example. For so shifting the color of printing, the ordinary bichrome shaft of the Underwood typewriting machine is utilized, said shaft being the shaft 107 described above, which is adapted to release the releasing roll 82. To control this bichrome shaft 107, there depend from it, two pendants 118 and 120, the former of which is adapted to be operated by the bail 117, above described, which controls the subtraction catch 109. This pendant 118 may cause red printing. To thus operate said pendant, the shaft 116 on which the bail 117 is mounted, is provided with a second rock arm 119, said rock arm being adapted to rise up and strike the pendant 118 whenever a column-selecting key 34 is depressed, to produce subtraction. The other pendant 120 is adapted to be struck by a rock arm 121, which is mounted on the shaft 122, and is operated by a bail 123, the bail 123 overlying the lugs 78 when they are in their adding position. The result is that when any column-selecting key 34 is depressed to cause addition, the pendant 120 will shift the ribbon mechanism so that said ribbon mechanism will write green, while if the column-selecting key is depressed with its lug 78 in the subtraction position, it will move the pendant 118 to cause red printing. This result is obtained by giving the bichrome shaft 107 a large throw when green printing is desired, and a small throw when red printing is desired, both throws being in the same direction.

Figure 10:
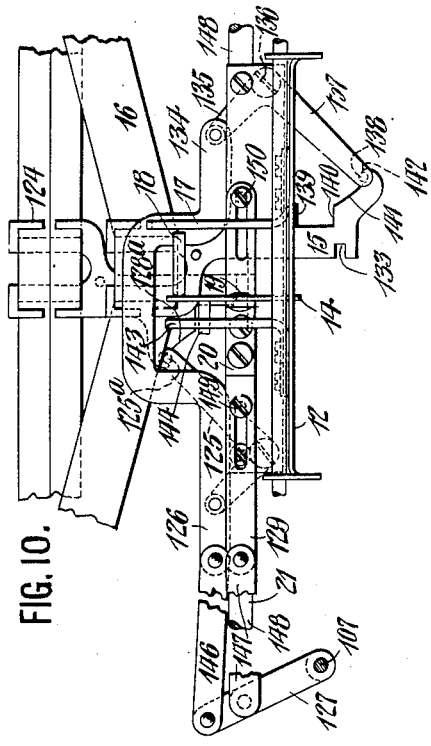
Fig. 10 is a view similar to Fig. 8 but with the parts viewed from the rear instead of from the front.
Figure 11:
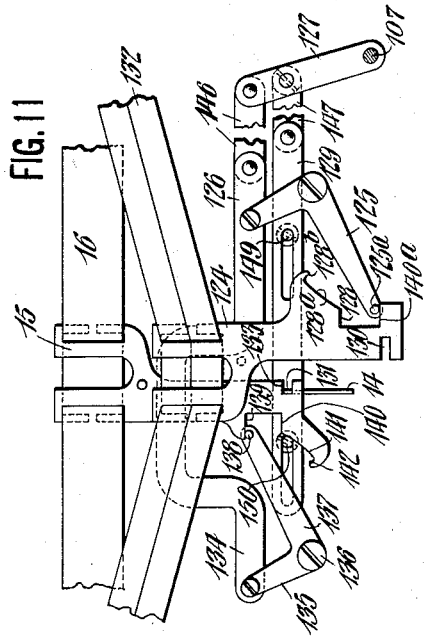
Fig. 11 shows the ribbon mechanism set to write black.
Figure 8:
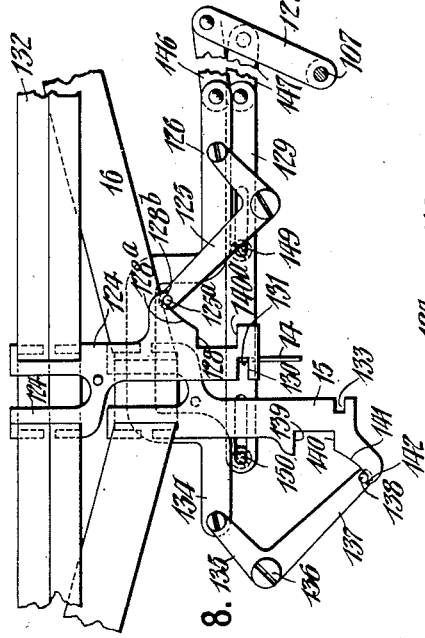
Fig. 8 is a front view of the ribbon mechanism showing it as set to write green.
Figure 9:
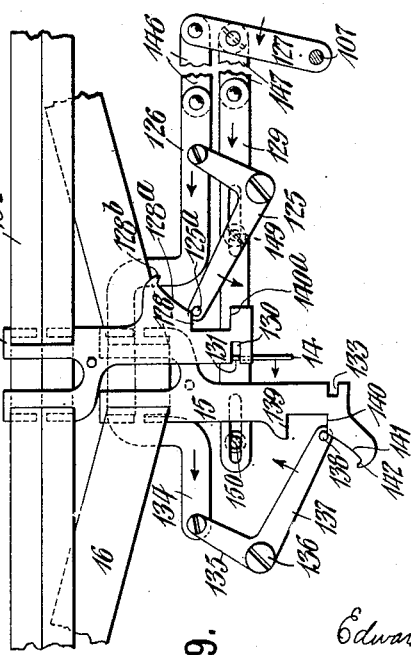
Fig. 9 is a similar view showing the ribbon mechanism set to write red.

As described above, in the ordinary printing operation, the pin 18 on the ribbon vibrator 14 engages in the slot in the actuator 17, thus causing the black ribbon 16 to do printing. If it be desired to change the color to red, the subtraction setting is brought about as described above, and then the alphabet or numeral keys are operated to cause printing. This printing is accomplished through a secondary ribbon vibrator 124, which is shifted by the bichrome shaft 107 from the position which it normally occupies shown in Fig. 11, completely beneath the black ribbon, to the upper position shown in Figs. 8, 9 and 10. This shifting is brought about by a bell crank 125 which is pivoted at a suitable point in the platen shift frame, and is connected by a link 126 to a rock arm 127 fast on the bichrome shaft 107. When the bichrome shaft is shifted moderately to the right, into the position shown in Fig. 9, and from the extreme left-hand position shown in Fig. 11, a shift pin 125ª on the end of the bell crank 125 catches a ledge 128 forming part of the supplementary ribbon carrier 124 and lifts said ribbon carrier to the position seen in Fig. 9. At the same time, a secondary link 129 also attached to the rock arm 127, draws the ribbon vibrator 14 to the right into an open ended slot 130, formed in the lower end of said supplementary ribbon vibrator. In this position, the pin 18 still remains in the slot 17 of the actuator, because said pin is longer than the pin in the standard Underwood machine, with the result that the vibrator 14 continues to vibrate precisely as if the bichrome shaft 107 had not been rocked.

The front end 131 of the vibrator 14 makes a close fit with the slot 130, and the sides of said slot are parallel and extend quite a distance into the supplementary vibrator, thus giving at all points along said slot a positive action to the supplementary ribbon carrier 124, with the result that said ribbon carrier vibrates positively upward and downward with the backward and forward movement of the universal bar 12. In this Fig. 9 position, the upper or red section of the bichrome ribbon 132 comes just to the printing point, with the result that the printing mechanism will print in red. It will be observed that this red printing can be effected entirely distinct from any computing operation, so long as the numeral keys are not depressed. Thus, the color-printing in the present machine is of use in typewriters as well as in computing machines.

If it be desired to print in green, the proper column-selecting key has its lug at its frontmost position when it is set for addition, and then the key is depressed to effect the shifting to addition, and then the proper numeral or alphabet keys are depressed for printing. The depression of the proper column-selecting key to accomplish this printing in green, operates on the bichrome shaft 107 in such a way that said shaft is rocked to an extreme right-hand position, seen in Fig. 8, this position being brought about when the column-selecting key 34 is depressed, as shown in Fig. 6, in which position, the pendant 120 rises to the full extent. The actuator 14 engages the slot 130 precisely as described above, except that said actuator passes all the way into the end of the slot 130, this being so because in shifting from the normal position seen in Fig. 11 to the Fig. 9 position, the bichrome shaft draws on the links 126 and 129 as it did for the motion described in Fig. 8, except that said motion is of greater extent and is sufficient to bring the front end of the ribbon vibrator 131 into the end of the slot 130. In shifting from the Fig. 9 to the Fig. 8 position, the bell crank pin 125ª escapes from the ledge 128 and moves idly along a cam extension 128ª of said ledge. At the end of said cam extension is a hook 128ᵇ to prevent the pin 125ª from slipping clear of the carrier 124. In order to permit the shifting from the normal position seen in Fig. 11 to the position seen in Figs. 8, 9 and 10, the usual ribbon carrier 15 has been slightly modified,—the modifications for the most part are as shown in the McLaughlin patent identified above. As thus modified, the vibrator 14 engages the actuator 15 by means of a slot 133 resembling the slot 130 in the supplementary carrier, though usually not so deep. This carrier 15 is positively moved to and from the position to engage the vibrator 14 by means of an extension of the link 126 which is U-shaped to arch over the ribbon vibrating mechanism, and extends to the opposite side of said mechanism at 134, where it is connected to a bell crank 135 pivoted at 136 on the platen shift frame. The other end 137 of said bell crank moves the carrier 15 either to the upper position shown in Fig. 11 or the lower position shown in Figs. 8, 9 and 10, in which latter position, it is clear of the vibrator 14. To enable the bell crank arm 137 to do this, a pin 138 thereon is adapted to lift said carrier, by striking a ledge 139 formed as an upper portion of a cut-out in said carrier 15. To positively carry the carrier 15 downward with its black ribbon to ineffective position, the pin 138 is adapted to strike the lower portion 140 of said cut-out and positively move it down. The supplementary carrier 124 is provided with a similar ledge 140ᵃ for the same purpose, said ledge 140ᵃ coöperating with the pin 125ᵃ.

Owing to the fact that the bichrome shaft 107 has two positions, and therefore is likely to shift the bell crank 137 beyond the point where the carrier 15 ought to go, the cut-out portion in the carrier 15 has its lower end extended in a cam 141 coinciding with the throw of the bell crank lever 137, and including a hook 142 at the extreme limit of said throw, in order to prevent the pin 138 from escaping from the carrier 15. These parts correspond to the analogous parts in the carrier 124.

In order to vary the throw of the vibrator 14 to enable either the red or green stripe of the ribbon 132 to be utilized, there is provided a second actuator 143, fast on the universal bar 12, said actuator adapted to coöperate with a short pin 144, projecting sidewise from the vibrator 14 at a point considerably nearer its pivot 19 than is the pin 18. The pin 144 is always free of its actuator, except when the lower or green stripe of the ribbon 132 is brought into use and when the vibrator 14 is swung over far enough to make the pin 144 engage with its slot in the actuator 143. The pin 18 is carried by the same motion entirely clear of its slot in the actuator 17. As a result of this structure, only one of the pins 18 and 144 is ever operable by the universal bar at a given time, although one of them is always operable.

In order to make the operation of the device easy and positive, various compensating members and guides are introduced, some of which are the link 146 between the bichrome shaft rock arm 127 and the link 126, and the link 147 between said rock arm and the link 129. The link 129, furthermore carries the pivot 19 on the platen shift frame, about which the vibrator 14 rotates when it is guided by its pins 144 and 18. This link is provided not only to give the actuator 14 the necessary slight shift to make it engage properly in the two slots 130 and 133, but also to cause the pins 18 and 144 to engage their respective slots as described just above. The link 129 for this purpose, is guided on the usual rod 148 of the platen shift frame by screws 149 and 150, on which the link slides by means of slots. The fixed guides for the ribbon carriers are omitted for the sake of clearness, and are described in said McLaughlin patent.

I have also shown means whereby the computing mechanism may be almost completely under the control of the column-selecting keys. For this purpose, the starting lever 87 on which the column-stops 26 are effective, is only held to its pivot by means of a thumb-screw 151. If this thumb-screw is undone, and said lever, together with its link 88, is thrown over, so as to lie idly against part of the mechanism, such as the bichrome shaft 107, the general operator will only be started by the starting key 92, or some other connection effective thereon. In order that the starting may be done automatically by depression of a column-selecting key, as may advantageously be done in adding there is a rock arm 152 fast on the arms of the bail 40. This rock arm extends rearwardly, and therefore will be rocked downwardly whenever any column-selecting key 34 is depressed. The rocking down of this arm 152 depresses the starting key 92 by means of a pendant 153 hanging down from the rock arm 152 and overlying the starting key 92. This pendant 153 is normally out of use and is brought into operation only when the automatic starting lever 87 is ineffective.

In order to make the starting pendant 153 ineffective when desired, said pendant extends through an opening in a plate 154, said plate sliding in guideways 155 and being adapted to be locked in any desired position along said guideways by a thumb-screw 156. The starting pendant 153 is clear of the starting key 92 whenever the plate 154 is in its rearward position.

To make sure that the general operator finishes its work before the carriage enters a new computing zone, the release and consequent travel of the carriage is delayed by locking the decimal tabulating keys until after a column-selecting key is depressed; in other words, holding up the completing of the tabulating until the general operator has completed its work.

For the purpose of returning the subtraction bar to addition position, the shaft 101ᵃ on which the handle is usually placed for manually operating the machine, is provided with a lug or arm 157. During the forward stroke of the general operator, this lug is adapted to strike a pawl 158 on an extension 159 of the subtraction bar 110, and thereby pull said bar forwardly to normal or addition position, against the tension of spring 111, said extension serving as a guide for the forward end of said bar, and embracing the shaft 101ᵃ. This pawl is normally thrust by a small spring 160 against a pin 161, both on the subtraction bar 110, so that it stands in the path of the lug 157, but is adapted to be swung out idly by lug 157 against the pressure of said spring 160 on the return stroke of said shaft, as the general operator returns to its normal position.

It will be observed that while all the connections in the present mechanism cannot well be used simultaneously (*e. g.*, the starting bar 88 and starting plunger 153), yet all the computation and color-control connections may be used if the computing mechanism is operated by the usual manual handle or crank referred to above.

It will be observed that the machine described is arranged merely for adding in a single column, or for cross-adding. This has been so described merely for the purpose of clearness, and the machine may be adapted for both cross-adding and for column-footing by the system of dogs in various planes described in the application of Frederick A. Hart, No. 466,836, filed December 10, 1908, (now Patent No. 1,270,411, dated June 25, 1918), and used in the Underwood standard adding machines, which include a plurality of controlling rolls. Such a plurality of rolls is disclosed in the copending application of William L. Gumprecht, No. 787,844, filed September 3, 1913, (now Patent No. 1,268,565, dated June 4, 1918), and such rolls may be effective on different denomination-selecting dogs either in the same or various planes for the purpose of separate column-footing or cross-adding, and any desired register may be individually settable to add or subtract at will, so that simultaneous adding and subtracting may be done, as in clearing totals. For this purpose, any register may be provided with the usual subtraction key, shown in the Minton application cited above.

Variations may be resorted to within the scope of the invention, and portions of the improvements may be used without others.

Having thus described my invention, I claim:

1. In a combined typewriting and computing machine, the combination with numeral keys and computing wheels, of a traveling carriage, column-selecting keys for positioning said carriage, printing types connected to said numeral keys, connections whereby said column-selecting keys may control the color of said printing, and means whereby said column-selecting keys may determine whether said computing wheels shall add, subtract, or be neutral.

2. In a combined typewriting and computing machine, the combination with numeral keys and computing wheels, of a traveling carriage, column-selecting keys for positioning said carriage, printing types connected to said keys, connections whereby said column-selecting keys may control the color of printing, a motor for driving said computing mechanism, and means controlled by the column-selecting keys for starting said motor.

3. In a combined typewriting and computing machine, the combination with computing mechanism, including a set of computing wheels, and column-selecting keys, of means whereby said column-selecting keys determine whether adding or subtracting shall be carried out on said wheels, and a motor for driving said computing mechanism also under the control of said column-selecting keys.

4. In a combined typewriting and computing machine, the combination with a traveling carriage and computing mechanism, of means independent of the carriage for automatically determining in which column adding or subtracting shall be done, and in what columns the computing mechanism shall be ineffective, column-selecting keys through which said means are effective, and color-printing means selectively under the control of said column-selecting keys.

5. In a combined typewriting and computing machine, the combination with a traveling carriage and computing mechanism, of means independent of the carriage for automatically determining in which column adding or subtracting shall be done, and in what columns the computing mechanism shall be ineffective, column-selecting keys through which said means are effective, color-printing means selectively under the control of said column-selecting keys, a motor for driving said computing mechanism, and means under the control of said column-selecting keys for connecting said motor to operate the computing mechanism.

6. In a computing machine, the combination with a traveling carriage, and a denomination selector therefor, of a catch adapted to cause said selector to remain in effective position, and a motor for moving the catch to ineffective position.

7. In a computing machine, the combination with a traveling carriage, and a denomination selector therefor, of a catch adapted to cause said selector to remain in effective position, a motor for moving the catch to ineffective position, means for computing, connections therefor adapted to occupy a normal and a plurality of abnormal positions to control the effectiveness of the computing, and means moved by said motor for bringing said connections to normal position.

8. In a computing machine, the combination with a traveling carriage, and a normally ineffective denomination selector therefor, of a catch adapted to hold said selector in effective position, means for computing in more than one manner, means for printing in more than one manner in accordance with the computing, and motor-operated means effective on said catch and controlled by the carriage, for restoring computing and printing to a normal condition.

9. In a combined typewriting and computing machine, the combination with column-selecting keys and computing devices, of means controlled by said keys for printing in more than one color in a selected column, a motor operating the computing devices, means operated by said column-selecting keys for connecting said motor, and means controlled by said motor for restoring the color-printing means to a normal state.

10. In a computing machine, the combination with computing mechanism column-selecting keys and a motor, of a bail moved by said column-selecting keys, and means operated by said bail for connecting said motor to drive said computing mechanism.

11. In a computing machine, the combination with computing mechanism, including a set of computing wheels arranged to alternatively add or subtract, of column-selecting keys, a motor, means operated by said keys for connecting said motor to drive said wheels, and means moved by said motor for compelling said wheels to be normally effective in a certain predetermined manner at the close of an actuation by said motor.

12. In a combined typewriting and computing machine, the combination with alphabet and numeral keys, of printing means adapted to print in three colors, means whereby the keys normally print in one color, computing mechanism adapted to add or subtract the numbers written by the numeral keys, connections whereby the printing means is effective to print in one abnormal color in subtracting and another abnormal color in adding, and means effective at the completion of any computing operation to restore the printing to the normal color.

13. In a combined typewriting and computing machine, the combination with numeral keys and a computing device, of power means for driving said computing device, a typewriter carriage, a column-selecting key, a tabulating key for positioning said carriage to the column selected, means whereby said selecting key connects said power means, to drive said computing device, and delaying means associated with said tabulating key and controlled by said selecting key, to enable the power means to complete its action before the carriage starts to move.

14. In a computing machine, the combination with a carriage, of a column selecting key for positioning said carriage, a computing device, power means for driving said computing device, means whereby said selecting key when depressed, connects said power means to said computing device, and delaying means associated with said tabulating key, to enable the power means to complete its action before the carriage starts to move.

15. In a computing machine, the combination with column-selecting keys, and computing devices adapted to compute in more than one manner in a column; of means arranged to print in a normal color and also in abnormal colors in a selected column in accordance with the manner of computing; a motor for operating the computing devices; means for automatically starting the motor; and means controlled by said motor for restoring both the printing and the computing to a normal state.

16. In a computing machine, the combination of computing mechanism; state-control mechanism settable to selectively disconnect said computing mechanism, or to cause either addition or subtraction to be performed thereby; printing mechanism comprising a set of type-operating keys, a bichrome ribbon device shiftable to cause printing by the types in one color for addition and in a second color for subtraction, and a separate ribbon device for causing printing by said types in a third color when the computing mechanism is disconnected; and means operated by said state-control mechanism for throwing in either ribbon device and for shifting the bichrome ribbon device, when thrown in, to cause printing in either color thereof according to the character of computation.

17. In a computing machine, the combination of computing mechanism; state-control mechanism settable to selectively disconnect said computing mechanism, or to cause either addition or subtraction to be performed thereby; printing mechanism comprising a set of type-operating keys, a bichrome ribbon device shiftable to cause printing by the types in one color for addition and in a second color for subtraction, and a separate ribbon device for causing printing by said types in a third color when the computing mechanism is disconnected; means operated by said state-control mechanism for throwing in either ribbon device and for shifting the bichrome ribbon device, when thrown in, to cause printing in either color thereof according to the character of computation; and means for automatically throwing out said bichrome ribbon device at the completion of each computing operation, and throwing in the other ribbon device.

18. In a computing machine, the combination of computing mechanism; state-control mechanism settable to selectively disconnect said computing mechanism, or to cause either addition or subtraction to be performed thereby; printing mechanism comprising a set of type-operating keys, printing ribbons normally clear of the printing line, and ribbon mechanism shiftable to cause selective shifting of the ribbons when printing, so that the types print in one color for addition, in a second color for subtraction, and in a third color when the computing mechanism is disconnected; and connections between said ribbon mechanism and said state-control mechanism for setting the former by the latter to accord with the state of the computing mechanism.

19. In a computing machine, the combination of computing mechanism; state-control mechanism settable to selectively disconnect said computing mechanism, or to cause either addition or subtraction to be performed thereby; printing mechanism comprising a set of type-operating keys, printing ribbons normally clear of the printing line, and ribbon mechanism shiftable to cause selective shifting of the ribbons when printing, so that the types print in one color for addition, in a second color for subtraction, and in a third color when the computing mechanism is disconnected; connections between said ribbon mechanism and said state-control mechanism for setting the former by the latter to accord with the state of the computing mechanism; and means for automatically restoring the ribbon mechanism to a position to cause printing in a predetermined one of said three colors at the completion of each computing operation.

20. In a computing machine, the combination of computing mechanism; state-control mechanism settable to selectively disconnect said computing mechanism, or to cause either addition or subtraction to be performed thereby; printing mechanism comprising a set of type-operating keys, printing ribbons normally clear of the printing line, and ribbon mechanism shiftable to cause selective shifting of the ribbons when printing, so that the types print in one color for addition, in a second color for subtraction, and in a third color when the computing mechanism is disconnected; connections between said ribbon mechanism and said state-control mechanism for setting the former by the latter to accord with the state of the computing mechanism; and means for automatically restoring the ribbon mechanism to a position to cause printing in said third color at the completion of each computing operation.

21. In a computing machine, the combination with a traveling carriage, and computing devices; of a denomination selector for said carriage, associated with said computing devices; a controller movable into position for co-action with said selector to render the latter effective; a catch for holding said controller in effective position; a motor for driving the computing devices; and means governed by said motor for releasing said catch, to permit the movement of said controller out of effective position.

22. In a computing machine, the combination with a traveling carriage, and computing devices; of a denomination selector for said carriage associated with said computing devices; a catch for causing said selector to remain in effective position; a motor for driving the computing devices; a rock shaft connected to release said catch; and connections between said rock shaft and said motor to operate the former from the latter.

23. In a computing machine, the combination with a traveling carriage, computing devices, and a general operator therefor; of a denomination selector for said carriage associated with said computing devices; a catch for causing said selector to remain in effective position; a restoring device connected to release said catch; a shaft rotated at the actuation of the general operator; and a cam on said shaft for operating said restoring device.

24. In a combined typewriting and computing machine, the combination with typewriter printing keys, a set of computing wheels, and state-control mechanism associated with said wheels settable to cause them to either add or subtract or to be neutral during printing; of printing ribbons for printing in three distinct colors, one for each of such states, and means for determining the active color; and a common controlling means for said state-control mechanism and said color-determining means, whereby the color of each printed number indicates whether or not said number was computed, and if computed, whether additively or subtractively.

25. In a combined typewriting and computing machine, the combination with a typewriter printing keys, a set of computing wheels, and state-control mechanism associated with said wheels settable to cause them to either add or subtract or to be neutral during printing; of printing ribbons for printing in three distinct colors, one for each of such states, and means for determining the active color; a common controlling means for said state-control mechanism and said color-determining means, whereby the color of each printed number indicates whether or not said number was computed, and if computed, whether additively or subtractively; and means for restoring said state-control mechanism to neutral and said color-determining means to the corresponding position at the conclusion of each computing operation.

26. In a combined typewriting and computing machine, the combination with typewriter printing keys, a set of computing wheels, and state-control mechanism associated with said wheels settable to cause them to either add or subtract or to be neutral during printing; of printing ribbons for printing in three distinct colors, one for each of such states, and means for determining the active color; selecting keys for determining the columns wherein printing and computation shall take place; and means under the control of said keys for actuating said state-control mechanism and said color-determining means, whereby the color of any printed number in a column indicates whether or not said number was computed, and if computed, whether additively or subtractively.

27. In a computing machine, the combination with a traveling carriage, and column-selecting and tabulating keys associated therewith; of computing mechanism; a motor for driving said computing mechanism: means normally locking the tabulating key against operation, but releasable at the depression of the selecting key; and means operated by said locking means during its releasing movement for starting said motor.

28. In a computing machine, the combination with a traveling carriage, and column-selecting and tabulating keys associated therewith; of computing mechanism; a motor for driving said computing mechanism; a locking device normally holding the tabulating key against operation, but releasable at the depression of the selecting key; and a member connected to said locking device to be operated thereby during its releasing movement for starting said motor.

29. In a computing machine, the combination with a traveling carriage, and column-selecting and tabulating keys associated therewith; of computing mechanism; a motor for driving said computing mechanism; a locking device normally holding the tabulating key against operation, but releasable at the depression of the selecting key; a member connected to said locking device to be operated thereby during its releasing movement for starting said motor; and means connected to move said starting member into or out of effective position to start said motor.

30. In a computing machine, the combination with a traveling carriage, and a key for positioning the same; of computing mechanism; a motor for driving said mechanism; a starting key for said motor; a bell crank operated by said positioning key, consequent upon its depression; and a pendant carried by said bell crank for depressing said starting key.

31. In a computing machine, the combination with a traveling carriage, and a key for positioning the same; of computing mechanism; a motor for driving said mechanism; a starting key for said motor; a bell crank operated by said positioning key, consequent upon its depression; a pendant carried by said bell crank for depressing said starting key; and means connected to move said pendant into or out of position to depress said starting key.

32. In a combined typewriting and computing machine, the combination with a traveling carriage and computing devices, of a denomination-selector for said computing devices associated with said carriage, a controller movable into position for coaction with said selector to render the latter effective, a motor for driving the computing devices, and means governed by the motor for returning said controller to ineffective position.

33. In a combined typewriting and computing machine, the combination with numeral keys and computing wheels, of types controlled by said keys adapted to print in any one of three colors, connections whereby said keys may be effective to cause said wheels to add or subtract, or may be ineffective thereon, a traveling carriage, connections for positioning the carriage in any one of a plurality of zones and simultaneously determining the nature of the connections between said keys and said wheels, a single shaft adapted to be variably turned to determine in which color the printing shall be effected, and connections whereby the positioning of the carriage by said positioning connections is effective on said shaft to determine the printing color.

34. In a combined typewriting and computing machine, the combination with numeral keys and computing wheels, of computing mechanism, a traveling carriage, types adapted to write numbers in columns determined by said carriage, connections whereby the numbers written in a given column may be computed or not computed at will, color-controlling devices adapted to cause said types to print in a normal and an abnormal color, and connections such that if the typewriter carriage is brought to a computing column, without the computing connections being made effective, the types will write in the normal color; the connections being such that if the computing mechanism is effective in any column, the types will write in an abnormal color.

35. In a combined typewriting and computing machine, the combination with numeral keys and computing wheels, of computing mechanism, a traveling carriage, types adapted to write numbers in columns determined by said carriage, connections whereby the numbers written in a given column may be computed or not computed at will, color-controlling devices adapted to cause said types to print in a normal and an abnormal color, and connections such that if the typewriter carriage is brought to a computing column, without the computing connections being made effective, the types will write in the normal color; the connections being such that if the computing mechanism is effective in any column, the types will write in an abnormal color, said abnormal color depending on the character of computation being performed.

36. In a combined typewriting and computing machine, the combination with numeral keys and computing wheels, of computing mechanism, a traveling carriage, types adapted to write numbers in columns determined by said carriage, column-selecting keys, connections under the control of said column-selecting keys, whereby the numbers written in a given column may be computed or not computed at will, color-controlling devices adapted to cause said types to print in a normal and an abnormal color, and devices adapted to be effective on said connections under the control of said column-selecting keys, such that if the typewriter carriage is brought to a computing zone by operation of a column-selecting key with said devices effective, the computing mechanism will be effective and the types will write in an abnormal color, but if the typewriter carriage is brought to a computing zone, without operation of the column-selecting keys, the types will write in the normal color.

37. In a combined typewriting and computing machine, the combination with numeral keys and computing wheels, of a traveling carriage, types adapted to write numbers in columns determined by said carriage, column-selecting keys adapted to select columns, settable devices made effective by the operation of the column-selecting keys for determining whether the numbers written in the given column shall be computed or not computed, and if computed, whether added or subtracted, color-controlling devices adapted to cause said types to print in a normal and a plurality of abnormal colors, and connections operated by said column-selecting keys, effective to cause the types to write in an abnormal color, depending on whether the numbers are computed additively or subtractively; the connections being such that if the typewriter carriage is brought to a computing column, without operation of the column-selecting keys, the types will write in the normal color.

EDWARD THOMAS.

Witnesses:
 JULIUS DUCKSTINE,
 W. O. WESTPHAL.